March 19, 1935.   C. F. WALLACE   1,995,270
ELECTRIC MOTOR
Filed June 10, 1933.

INVENTOR
Charles F. Wallace
BY
Arthur L. Kent
ATTORNEY

Patented Mar. 19, 1935

1,995,270

UNITED STATES PATENT OFFICE 1,995,270

ELECTRIC MOTOR

Charles F. Wallace, Westfield, N. J., assignor to Wallace & Tiernan Products, Inc., Belleville, N. J., a corporation of New Jersey Application June 10, 1933, Serial No. 675,285

14 Claims. (Cl. 172—126)

This invention relates to alternating current motors, and more particularly to small motors such as are used for operating instruments such as recording meters, clocks, and telemetering apparatus. The object of the invention is to provide a small motor to operate on alternating current and to run at a speed proportional to the frequency of the current, which shall be self-starting and highly efficient and capable of operating on a fraction of the current required by the commonly used small alternating current synchronous motors, and which shall be of simple and rugged construction and reliable in operation.

My new motor is a resonance motor. It has as essential parts an oscillating, or vibrating, member having a natural perod of oscillation substantially equal to the frequency of the change in direction, or period of alternation, of the current by which it is operated, and means whereby a periodic force produced by the alternating current is applied to said member, and means for producing rotary movement from the oscillatory movement of such member.

The high efficiency of the new motor is illustrated by the fact that a motor according to the invention of sufficient power to operate instruments such as recording meters requires only from ½ to 1½ milliamperes at 110 volts, and not more than 1 to 3 milliamperes at 60 volts. Small synchronous alternating current motors such as are now used for doing the same work take approximately 45 milliamperes at 110 volts, or 90 milliamperes at 60 volts.

Two types of motors according to the invention are illustrated, by way of example, in the accompanying drawing, wherein.

The electromagnetic type of motor according to the invention comprises an alternating current electromagnet, which most desirably has a soft iron core and pole-pieces, and a vibrating member or armature which is or comprises a magnet having constant polarity, which is preferably a polarized steel bar, but might be a direct current electromagnet with or without a core and pole-pieces of magnetic material. For convenience, the term permanent magnet will be used to include both a permanent steel magnet and also a direct current electromagnet. The reversal of polarity in the alternating current electromagnet produces a reversal in the direction of the force applied to the vibrating member, and, the natural period of vibration of the vibrating member being equal to the period of alternation of the current, the member will have applied thereto a periodic force which will cause a relatively powerful vibration of the member.

Figure 1:
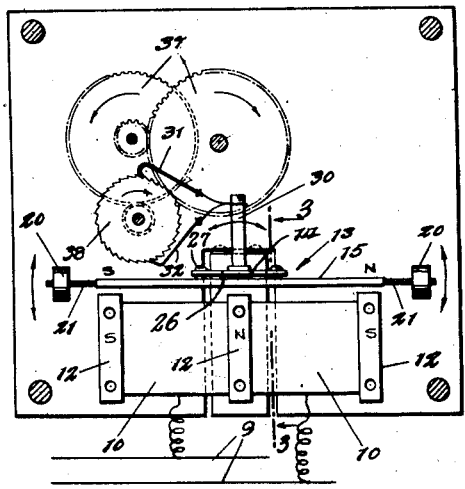
Fig. 1 is a side elevation of an electromagnetic type motor, with one of the side plates removed and parts in section.
Figure 2:
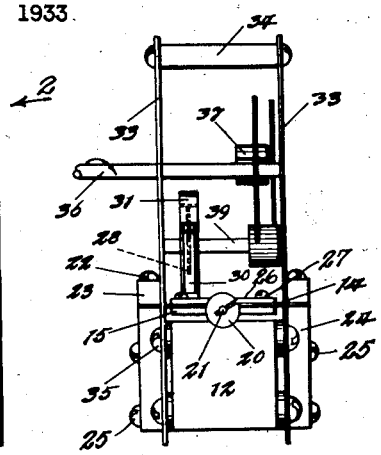
Fig. 2 is an end view of the same, looking in the direction of the arrow 2 of Fig. 1.
Figure 3:
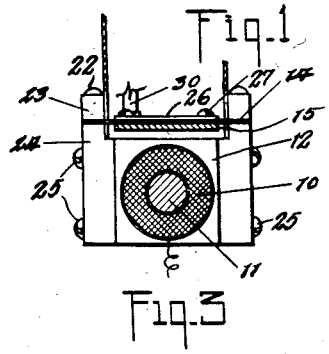
Fig. 3 is a section on the line 3—3 of Fig. 1.

As shown in Figs. 1, 2 and 3, the electromagnetic resonance motor has a double alternating current magnet receiving current from a line 9. The magnet has two coils 10 wound around a soft iron core 11 provided with three soft iron pole-pieces 12. The coils are arranged in series, and are so wound that the two outer pole-pieces always have at any instant like polarity and the middle pole-piece always has the opposite polarity to the two outer ones. Longitudinally of the coils and above them is an oscillating member 13 rigidly mounted on a torsion bar 14 of spring metal or other elastic material. Most desirably, and as shown, this torsion bar is a thin strip of steel. It is rigidly supported at its ends, its central portion, on which the magnet is mounted, being free to oscillate torsionally.

The oscillating member 13 comprises a permanent magnet 15 in the form of a flat bar of magnetic steel having its poles on either side of the torsion bar and above the outer pole-pieces of the alternating current electromagnet. When the flow of current through the latter is such that its outer pole-pieces are S-poles, then the right-hand end, or N-pole, of the magnet 15 will be attracted, and the left-hand end, or S-pole, of the magnet 15 will be repelled, thereby exerting a force which will tend to cause the magnet to turn and twist the central part of the torsion bar. When the flow of current through the coils reverses, and with it the polarity of the outer pole-pieces of the electromagnet, the right-hand end of the magnet 15 will be repelled and the left-hand end attracted, thereby exerting a force which will tend to turn the magnet and twist the torsion bar in the opposite direction.

The vibrating member 13 is thus subjected to a periodic force which causes it to oscillate about the axis of the torsion bar 14. The member 13 is constructed so that its natural period of oscillation is substantially the same as the period of alternation of the applied current, so that resonance results and oscillations of large amplitude are produced with the expenditure of relatively little energy.

In order to obtain for an oscillating member of any considerable mass the high natural period of oscillation required for resonance with the usual 60 cycle alternating current, it is necessary to have a comparatively strong force opposing the movement of the member from its normal position of rest. Such necessary force is provided in the construction shown by the torsion bar 14.

The period of oscillation of the member 13 depends upon the moment of inertia of the member and the torsional force of the bar 14. To enable the moment of inertia, and thereby the natural period of oscillation of the member, to be adjusted, weights 20 are mounted on threaded projections 21 on the ends of the magnet 15. By screwing these weights in or out, the oscillating member may be "tuned", or brought into resonance relation with the applied current.

The bar 14 has its ends clamped by screws 22 between bars 23 and the tops of two cheek pieces 24 which are secured by screws 25 one to either side of the central pole-piece 12. The magnet 15 is secured on the bar 14 by clamping the bar between the magnet and a plate 26 by screws 27.

Extending from the plate 26 is an upwardly projecting post or arm 30 which carries a pair of oppositely acting pawls 31 and 32 which drive a clockwork train. The clockwork train is supported by two side plates 33 spaced apart at the top by bars 34 and at the bottom by the outer pole-pieces 12 to which they are attached by screws 35.

Journaled in the side plates is a main or delivery shaft 36 which is connected through a suitable speed reducing gear train 37 to a ratchet wheel 38 on a shaft 39. The ratchet wheel is given a step-by-step rotary movement by the two pawls 31 and 32 engaging the top and bottom, respectively, of the ratchet wheel. These pawls are connected to the top of the arm 30 by thin spring strips tensioned to press the pawls against the ratchet wheel.

In the piezoelectric crystal type of resonance motor according to the invention, the periodic force applied to the tuned vibrating member is produced by applying an alternating electric field to a vibrating piezoelectric crystal element. I have used and consider best a torque, or twisting, element comprising two thin rectangular plates of Rochelle salt crystal having their crystal axes extending diagonally of the plates secured together with their diagonally extending crystal axes substantially perpendicular to each other with a thin metal sheet between them and a thin metal sheet on the outer face of each plate. When an alternating electric field is applied to the crystal plates of such an element by connecting the outside metal sheets to one side of an alternating current supply line, and the inside metal sheet to the other side of the supply line, and the element is held at one end, the free end of the element takes up a periodic twisting, or torsional, movement. Such elements are well known. Other piezoelectric crystals may be used, but Rochelle salt crystals have been found best.

Figure 4:
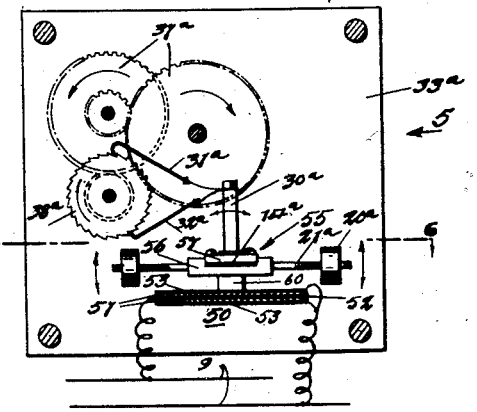
Fig. 4 is a side elevation of a piezoelectric crystal type motor, with one side plate removed and parts in section.
Figure 5:
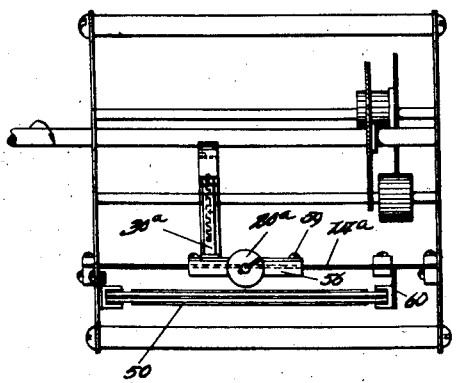
Fig. 5 is an end view of the same, looking in the direction of the arrow of Fig. 4.
Figure 6:
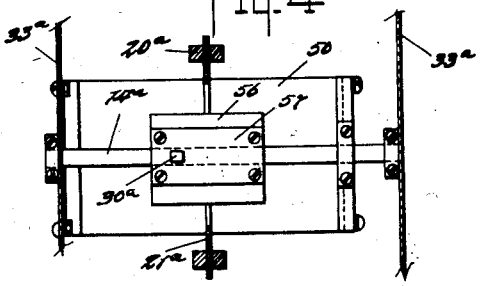
Fig. 6 is a section on the line 6—6 of Fig. 4.

In the motor shown by Figs. 4, 5 and 6, the piezoelectric element 50 is a torque element formed of two thin crystal plates 51, 51 placed flatwise together with an intervening thin metal sheet 52 and two outer thin metal sheets 53, the plates and sheets being secured together by suitable adhesive material so as to be incapable of independent movement. The inner sheet 52 is connected to one side of the supply line 9, and the outer sheets 53 are connected to the other side of such line. In this way both crystal strips are subjected to an alternating electric field. One end of this element is rigidly connected to one of the side plates 33, leaving the other end free to twist back and forth under the influence of the alternating electric field.

It is not essential that the element 50 have a natural period of vibration the same as that of the applied alternating current. It has relatively slight inertia as compared with the twisting forces resulting from the applied alternating electric field, and will, therefore, vibrate in synchronism with the latter. However, the amplitude of the vibrations is small, and it is desirable to amplify them before converting the vibratory movement into rotary movement.

The element 50 is therefore connected to apply its periodic force to an oscillating member tuned to the period of such force, that is, to the frequency of the alternating current, and the movement of this oscillating member is converted into rotary movement. In the construction shown, the tuned oscillating member 55 comprises two plates 56 and 57 between which a torsion bar 14a is clamped by means of screws 59. The ends of the torsion bar are rigidly attached to the side plates 33a. Rods 21a extend from the plate 56 horizontally in both directions transversely of the torsion bar, and tuning weights 20a are adjustably mounted on the threaded ends of these rods. A post 30a extends upward from the plate 57 and carries oppositely acting pawls 31a and 32a by which the ratchet wheel 38a is rotated to drive a clockwork train which as shown is like that of Figs. 1 and 2.

The torsion bar extends lengthwise of and above the crystal element 50, and the free end of the element is rigidly connected to the torsion bar by a connecting piece 60 at a point suitably distant from one end of the bar. The connection from the crystal element to the tuned oscillating member is made by connection to a point suitably near one end of the torsion bar in order to avoid harmful twisting of the crystal element which would result if the connection were made to a point nearer the center of the torsion bar or to other part of the tuned oscillating member, the oscillations of which are amplified as the result of resonance.

The new resonance motor has a further advantage in that it will operate only on alternating current the period of which is substantially the same as that of the oscillating member of the motor. The permissible difference in frequency of the oscillating member of the motor and of the applied current will vary somewhat according to the construction of the motor, and will depend upon the relation between the inertia of the oscillating member of the motor and the strength of the periodic force applied thereto. In all cases the oscillating member of the motor must have a period of oscillation which is substantially equal to the period of alternation of the applied current, and the more nearly equal the two periods are the higher will be the efficiency and the greater power of the motor.

The new motors of both types illustrated are self-starting and much more than ten times as efficient as the present commercial small synchronous alternating current motors.

What is claimed is:

1. A resonance motor for operation by alternating current, comprising a torsion member, an oscillating member rigidly secured to and carried by said torsion member and having a natural period of oscillation substantially equal to the period of alternation of the applied current, means whereby the flow of such current in one direction causes a force to be exerted on the member tending to move it in one direction and flow of current in the other direction causes a force to be exerted on the member tending to move it in the other direction, and means for translating the oscillatory movement of said member into rotary movement.

2. A resonance motor for operation by alternating current, comprising a torsion member, an oscillating member rigidly secured to and carried by the torsion member and having a natural period of oscillation substantially equal to the period of alternation of the applied current, means adjustable for tuning the oscillating member to the applied current by varying its moment of inertia means whereby the flow of such current in one direction causes a force to be exerted on the member tending to move it in one direction and flow of current in the other direction causes a force to be exerted on the member tending to move it in the other direction, and means for translating the oscillatory movement of said member into rotary movement.

3. A resonance motor for operation by alternating current, comprising an oscillating member comprising a permanent magnet arranged with one of its pole pieces offset with respect to the axis of oscillation of the member, a coil in circuit with the applied current arranged so as to attract said pole piece when the current flows through the coil in one direction and to repel said pole piece when the current flows in the opposite direction, the natural period of oscillation of the member being substantially equal to the period of alternation of the applied current, and means for translating the oscillatory movement of the member into rotary movement.

4. A resonance motor for operation by alternating current, comprising an oscillating member having a natural period of oscillation substantially equal to the period of alternation of the applied current, a piezoelectric crystal element adapted to oscillate in synchronism with the period of oscillation of an alternating electric field produced by the applied current, an oscillation transmitting connection between said element and said member, and means for translating the oscillatory movement of said member into rotary movement.

5. A resonance motor for operation by alternating current, comprising an elastic bar rigidly supported at one end, a weight secured to said bar at a distance from such end, the bar and weight combined having a natural period of oscillation substantially equal to the period of alternation of the applied current, a piezoelectric element adapted to apply a periodic force when subjected to an electric field produced by the applied current, a connection between said member and said bar nearer said supported end of the bar than said weight, and means for translating movement of said weight into rotary movement.

6. A motor for operation by alternating current, comprising a piezoelectric crystal element adapted to oscillate under the influence of an electric field produced by the applied current, an oscillating member driven by said element having a natural period of oscillation substantially equal to the period of alternation of the applied current, and means for translating the oscillatory movement of said member into rotary movement.

7. A motor for operation by alternating current, comprising a piezoelectric crystal element having two thin strips of piezoelectric crystal held flatwise together with their crystal axes substantially at right angles to each other and an intervening metal plate to which one terminal of a source of alternating current is connected and two outer metallic plates to which the other terminal of such source of current is connected, whereby the crystal strips are subjected to an alternating electric field, means for amplifying the resultant oscillations of the element, and means for translating the amplified oscillations into rotary movement.

8. A resonance motor for operation by alternating current, comprising a torsion bar rigidly supported at its ends, an oscillating member rigidly secured to and carried by said bar intermediate its ends, the weight of such member and the distribution thereof with respect to the axis of the bar and the torsional force of the bar being so correlated that the member has a natural period of oscillation substantially equal to the period of alternation of the applied current, means whereby the flow of such current in one direction causes a force to be exerted tending to move the member in one direction and flow of current in the other direction causes a force to be exerted tending to move the member in the other direction, and means for translating the oscillatory movement of said member into rotary movement.

9. A resonance motor for operation by alternating current, comprising an oscillating member having a natural period of oscillation substantially equal to the period of alternation of the applied current and comprising a permanent magnet having one of its pole pieces on one side and the other of its pole pieces on the other side of the axis of oscillation of the member, an alternating current magnet arranged so as to attract one pole piece of the magnet and repel the other when current flows therethrough in one direction and to repel the first pole piece and attract the second when the current flows in the opposite direction, and means for translating the oscillating movement of the member into rotary movement.

10. A motor for operation by alternating current, comprising a torsion bar rigidly supported at its ends, a polarized steel bar rigidly secured to said torsion bar and extending transversely thereof with its pole pieces on opposite sides of the torsion bar, an alternating current magnet arranged so as to attract one pole piece of the polarized bar and repel the other when current flows therethrough in one direction and to repel the said pole piece and attract the other pole piece of the polarized bar when the current flows in the opposite direction, a ratchet wheel adapted to rotate about an axis substantially parallel to the axis of the torsion bar, an arm projecting from the polarized bar away from said axis, and a pair of pawls carried by said arm for engaging opposite sides of the ratchet wheel, whereby the oscillations of the polarized bar produce rotation of said ratchet wheel.

11. A resonance motor or operation by alternating current, comprising a spring member rigidly supported at one end, an oscillating member rigidly secured to and carried by said spring member, the weight of said oscillating member and the distribution thereof with respect to the rigidly supported end of the spring member and the elastic force of the spring member being so correlated that the oscillating member has a natural period of oscillation substantially equal to the period of alternation of the applied current, means whereby the flow of the applied current in one direction causes a force to be exerted on the oscillating member tending to move it in one direction and a flow of current in the other direction causes a force to be exerted on the oscillating member tending to move it in the other direction, and means for translating the oscillating movement of the oscillating member into rotary movement.

12. A resonance motor for operation by alternating current, comprising a bar of elastic material rigidly supported at one end, an oscillating member rigidly secured to and carried by said bar at a distance from said end, the weight of said member and the distribution thereof with respect to the rigidly supported end of the bar and the elastic force of the bar being so correlated that the member has a natural period of oscillation substantially equal to the period of alternation of the applied current, means whereby the flow of the applied current in one direction causes a force to be exerted on said member tending to move it in one direction and a flow of current in the other direction causes a force to be exerted on said member tending to move it in the other direction, and means for translating the oscillating movement of said member into rotary movement.

13. A resonance motor for operation by alternating current, comprising a bar of elastic material rigidly supported at one end, an oscillating member rigidly secured to said bar at a distance from said end, a weight adjustable for tuning the oscillating member to the applied current by varying its moment of inertia, means whereby the flow of the applied current in one direction causes a force to be exerted on said member tending to move it in one direction and a flow of current in the other direction causes a force to be exerted on said member tending to move it in the other direction, and means for translating the oscillating movement of said member into rotary movement.

14. A resonance motor for operation by alternating current, comprising a torsion member, an oscillating member rigidly secured to and carried by said torsion member and having a natural period of oscillation substantially equal to the period of alternation of the applied current, means whereby the flow of such current in one direction causes a force to be exerted on the member tending to move it in one direction and flow of current in the other direction causes a force to be exerted on the member tending to move it in the other direction, and means for translating the oscillatory movement of said member into rotary movement comprising a ratchet wheel and a pair of pawls carried by the oscillating member for engaging opposite sides of the ratchet wheel.

CHARLES F. WALLACE.